(12) United States Patent
Altenschulte (10) Patent No.: US 7,551,130 B2
(45) Date of Patent: Jun. 23, 2009

(54) WIND TURBINE WITH DATA RECEIVER

(75) Inventor: Markus Altenschulte, Spelle (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/943,815

(22) Filed: Nov. 21, 2007

(65) Prior Publication Data

US 2009/0128402 A1    May 21, 2009

(51) Int. Cl.
*G01S 1/00* (2006.01)
(52) U.S. Cl. ............... 342/357.09; 342/357.06; 342/357.1
(58) Field of Classification Search ........... 342/357.09, 342/357.06, 357.1; 340/507, 511–512
See application file for complete search history.

(56) References Cited

U.S. PATENT DOCUMENTS

| | | | |
|---|---|---|---|
| 6,604,711 B1 * | 8/2003 | Stevens et al. ........... 244/135 A |
| 7,358,855 B1 * | 4/2008 | Willis .................... 340/539.28 |
| 2002/0029097 A1 * | 3/2002 | Pionzio et al. ............ 700/286 |
| 2004/0010350 A1 * | 1/2004 | Lof et al. ................ 700/292 |
| 2005/0017515 A1 * | 1/2005 | Roberts et al. ............ 290/55 |
| 2005/0017751 A1 * | 1/2005 | Gunn et al. ............... 324/771 |
| 2005/0282537 A1 * | 12/2005 | Burch et al. .............. 455/423 |
| 2006/0033338 A1 * | 2/2006 | Wilson .................... 290/44 |
| 2006/0162642 A1 * | 7/2006 | Morse ..................... 114/382 |
| 2006/0171798 A1 * | 8/2006 | Yamamoto et al. ......... 415/4.5 |
| 2007/0036655 A1 * | 2/2007 | Damgaard et al. ....... 416/170 R |
| 2007/0084768 A1 * | 4/2007 | Barber .................... 210/143 |
| 2007/0250226 A1 * | 10/2007 | Wrage et al. .............. 701/207 |
| 2007/0297892 A1 * | 12/2007 | Kildegaard ............... 701/300 |

FOREIGN PATENT DOCUMENTS

| | | |
|---|---|---|
| JP | 2006275845 A * | 10/2006 |
| WO | WO 01/56204 A1 * | 8/2001 |

OTHER PUBLICATIONS

T. Watanabe et al., Advanced measurement system with wide surveillance range of load fluctuation based on GPS, International Conference on Power System Technology, vol. 3, p. 1713-1716, 2000.*
At a substation near you . . . , Modern Power Systems, vol. 24(2), p. 33, Feb. 2004.*

* cited by examiner

*Primary Examiner*—Thomas H Tarcza
*Assistant Examiner*—Fred H Mull
(74) *Attorney, Agent, or Firm*—Global Patent Operation (57) ABSTRACT

A wind turbine is provided, the wind turbine including a receiver adapted to receive a signal from a satellite-based navigation system and to determine at least one of a position information, a time information and a date information from said signal, and a communication device adapted to transmit the information determined by the receiver to a recipient located remotely from said wind turbine.

17 Claims, 10 Drawing Sheets

WIND TURBINE WITH DATA RECEIVER

BACKGROUND OF THE INVENTION

A wind turbine including a data receiver as well as a wind farm and a method of installing a wind turbine using the data receiver are disclosed herein.

Wind energy is often used to generate electrical power at power plants, often referred to as wind farms, using, for example, the rotation of large wind turbines to drive electrical generators. As more and more wind turbines are installed, the fleet management and service organization requires detailed information about the individual turbines. For example, in cases where the wind turbine requires service due to a fault or usual maintenance, the service and maintenance team requires quick and detailed information about the exact location of the wind turbine. Typically, wind turbines are located in rural regions and/or remote areas. Therefore, often a ZIP code, address or street information is not available for the wind turbines. Furthermore, routes to the plant site are not always clear and particularly in winter street signs may be difficult to read.

Furthermore, when analyzing operational faults of a single wind turbine and/or of wind farms it is helpful or even necessary to have exact time and date information recorded with the operational data of the turbine. Especially for wind farms with several power lines a time accuracy down to a millisecond or so is required to identify the source of a problem. However, the built-in clocks of normal computer and controller clock systems usually show a drift so that the clock time becomes eventually inaccurate. In particular, the system clock times may differ between the controllers of different wind turbines or even between different controllers within the same turbine.

BRIEF DESCRIPTION OF THE INVENTION

In view of the above, a wind turbine is provided which includes a receiver adapted to receive a signal from a satellite-based navigation system and to determine at least one of a position information, a time information and a date information from said signal, and a communication device adapted to transmit the information determined by the receiver to a recipient located remotely from said wind turbine.

Further aspects, advantages and features are apparent from the dependent claims, the description and the accompanying drawings.

According to a first aspect, a wind power plant having a receiver is provided. The receiver is adapted to calculate at least one of a location, a daytime and a date from a signal received from a satellite-based navigation system. Furthermore, the wind turbine includes a transmitter for delivering the information calculated from the received signal to distant recipient.

According to a further aspect, a wind farm including at least two wind turbines each comprising a GPS receiver adapted to receive a GPS signal and to determine at least one of a position information, a time information and a date information from said GPS signal is provided.

According to another aspect, a method of installing a wind turbine includes receiving a signal with a receiver at the location of the wind turbine; determining a position of the wind turbine from the signal received at the location of the wind turbine; and storing said position of the wind turbine in a memory.

BRIEF DESCRIPTION OF THE DRAWINGS

A full and enabling disclosure of embodiments, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation. For example, features illustrated or described as part of one embodiment can be used on or in conjunction with other embodiments to yield yet a further embodiment. It is intended that such modifications and variations are included herewith.

Figure 1:
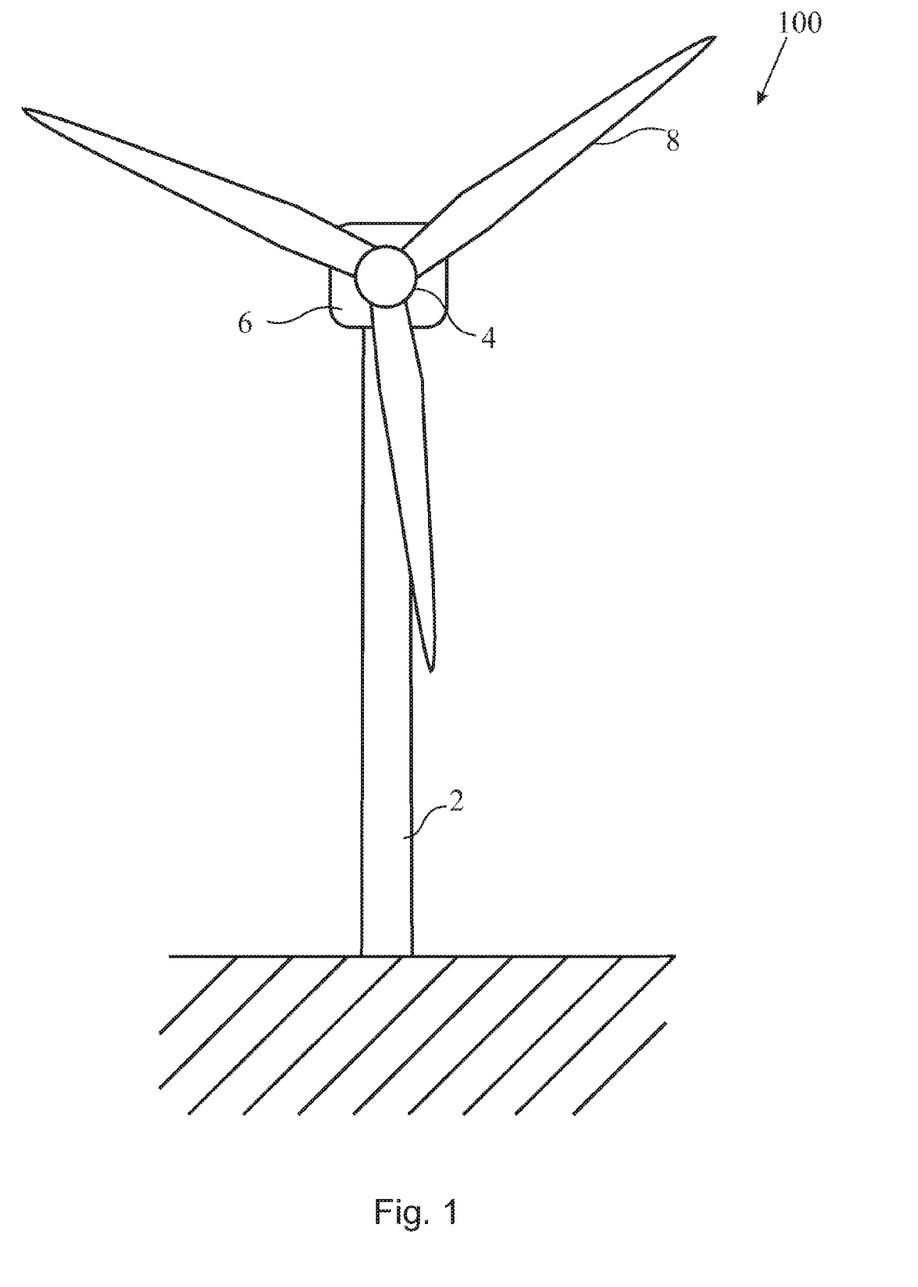
FIG. 1 shows a front view of a wind turbine.

FIG. 1 shows a schematic drawing illustrating a wind turbine 100 according to an exemplary embodiment. The wind turbine 100 includes a tower 2 on top of which a nacelle 6 is mounted. A wind rotor 4 equipped with three rotor blades 8 is rotatably mounted to nacelle 6. Kinetic energy is captured from the wind by rotor blades 8 and urges rotor 4 to rotate about its rotation axis. Rotor 4 is coupled to an electric generator (not shown) via a rotor shaft (not shown). Rotor 4 may be coupled to the generator either directly or via a gear box. Driven by rotor 4, the electric generator generates electric power which can then be fed to a utility grid or the like.

Figure 2:
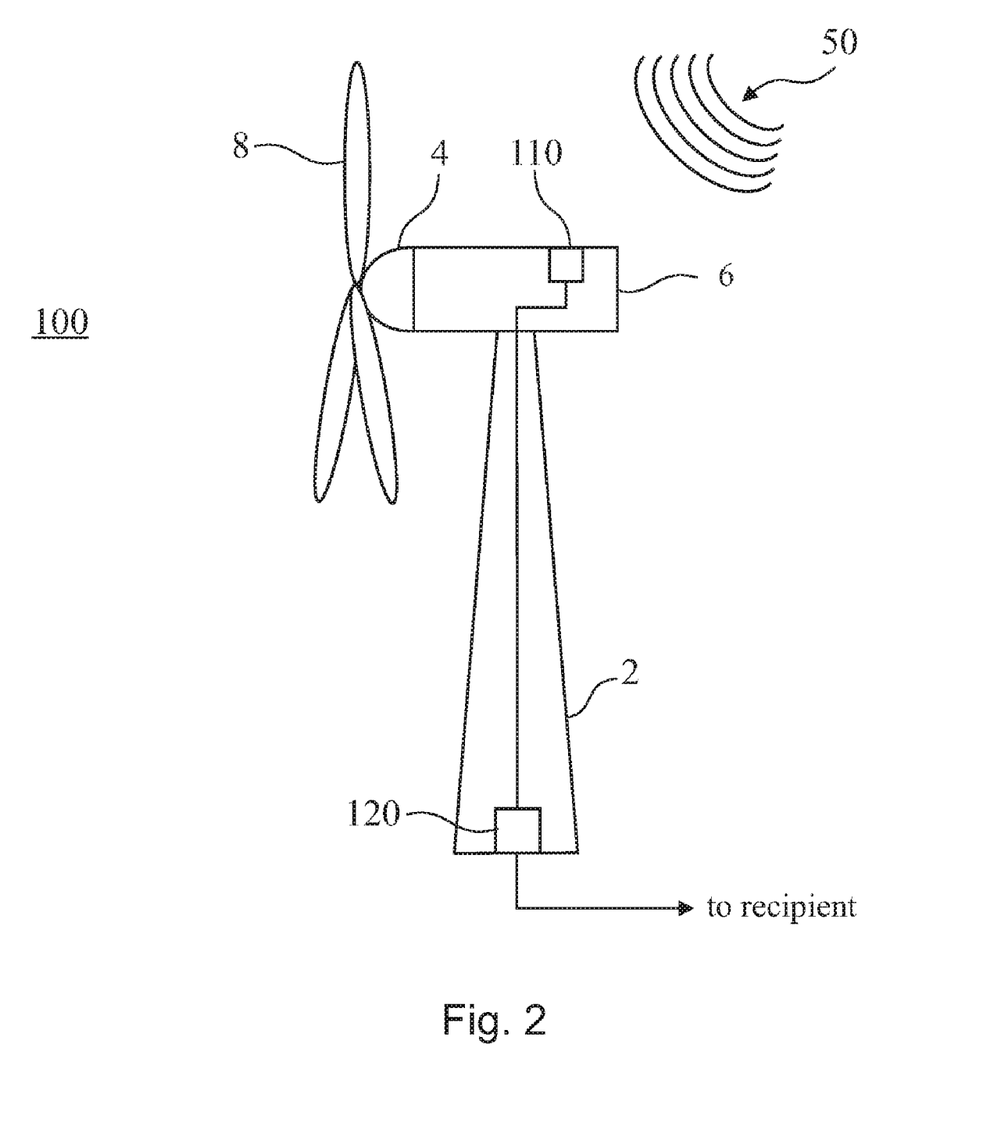
FIG. 2 shows a side view of a wind turbine according to an embodiment.

FIG. 2 shows a side view of a wind turbine 100 according to an embodiment. Therein, a receiver 110 is mounted at wind turbine 100. In the present embodiment receiver 110 is a GPS receiver adapted to receive a GPS signal 50 which is a precise microwave signal generated by each of the at least 24 satellites of the global navigation satellite system. The GPS receiver 110 can further determine its position and/or the actual time and the actual date at its position from the GPS signal. In particular, the time signal received with GPS signal 50 is based on atomic clocks and, therefore, is very accurate. Although the present description refers to GPS receivers, it will be understood by those skilled in the art that also other satellite-based navigation systems may be used. For example, a European satellite-based navigation system is planned to be launched within the near future. This system is known under the name GALILEO and, of course, also receivers adapted to receive a signal from the GALILEO system may be employed in embodiments of the present system. Furthermore, in principle any device capable of receiving exact position/location information may be used as a receiver in the embodiments described herein. It will be understood by those skilled in the art that the term GPS receiver is only exemplary used hereinafter and also those other receivers may be successfully employed in the embodiments described herein.

It is shown that GPS receiver 50 is installed at nacelle 6 of the wind turbine 100. Although GPS receiver 110 may be installed at any suitable location at the wind turbine or close to the wind turbine, positioning of GPS receiver 50 at the nacelle provides a good window to the satellites and, therefore, good reception of GPS signal 50. Of course, GPS receiver 110 may also be positioned at other locations within or nearby wind turbine 100.

Furthermore, wind turbine 100 includes a communication device 120 which is adapted to transmit information to remote recipients. Communication device 120 may be wired or wireless. In one example, communication device 120 includes an internet connection, especially an internet connection via an optical fiber connection, or a connection via telephone line. In other examples, communication device 120 includes a wireless connection to the recipient, e.g. a WLAN connection or a satellite connection. Furthermore, communication device 120 may also include a combination of different communication channels. For example, communication device 120 may have WLAN capability and also a connection to an optical fiber network. In embodiments, the communication device 120 is adapted to communicate the information extracted from GPS signal 50 by GPS receiver 110, e.g. exact position data and/or exact time and date, to a recipient located remotely from said wind turbine. For example, the recipient may be a remote control center and/or a service center and/or a maintenance center. Thus, the exact position, time and/or date information can be included into any message sent from the wind turbine to the remote control center.

In particular, when analyzing operational faults of a single wind turbine and/or of wind farms it is helpful or even necessary to have such exact time and date information recorded with the operational data of the turbine. Especially for wind farms with several power lines a time accuracy down to a millisecond or so is required to identify the source of a problem. Since the built-in clocks of normal computer and controller clock systems exhibit a drift, the clock time of these systems is or eventually becomes inaccurate. Furthermore, the system clock times are typically not synchronized between the controllers of different wind turbines or even between different controllers within the same turbine. Since the exact time is provided by GPS signal 50, it can be used to identify the exact point in time when a specific event occurred. In particular, the same GPS time signal is used for logging all the events occurring in one or more controllers of the same or different wind turbines so that the timely order of these events can be reconstructed by the remote control center. Thus, even complex situations can be resolved to find the cause of faulty operation.

Furthermore, the exact position of the wind turbine is determined from the GPS signal and can be communicated to a remote recipient. In one example, the remote recipient is a mobile receiver carried by service and/or maintenance personnel. For example, the remote recipient may even be a navigation system in the personnel's cars or trucks. Thus, wind turbines or wind farms at remote sites can be easily found by the maintenance staff and the fastest and/or shortest way to a faulty wind turbine can be shown to the service staff. Alternatively or additionally, the positional information may be communicated to a remote control center and/or a service center and/or a maintenance center. Then, the position of the faulty wind turbine can be displayed on a map and can be given to the service and/or maintenance staff before they leave the remote center. Furthermore, the positional information can also be transmitted to an ambulance or fire department in case an accident happened at the wind turbine site. In one example, the GPS positional information is directly transmitted to a rescue helicopter which is thus directed toward the wind turbine site.

Figure 3:
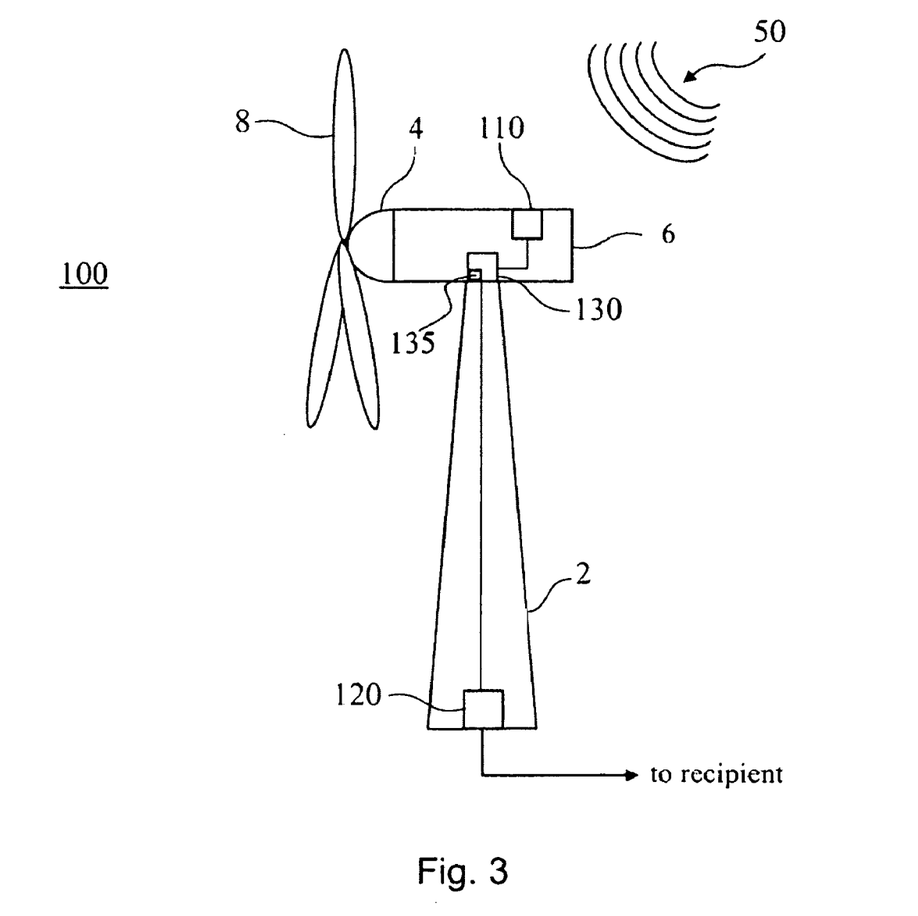
FIG. 3 shows a side view of a wind turbine according to another embodiment.

FIG. 3 shows a side view of a wind turbine 100 according to another embodiment. Therein, GPS receiver 110 is connected to a wind turbine controller 130 which, in turn, is connected to communication device 120. Additionally or alternatively, GPS receiver 110 may also be connected to a SCADA system of the wind turbine. Therein, SCADA is the acronym for Supervisory Control And Data Acquisition. Typically, SCADA refers to a distributed measurement and control system, which is typically used to perform data collection and control at the supervisory level. A supervisory control system is a system that is placed on top of a real-time control system to control a process that is external to the SCADA system. In wind turbine 100, at least one controller 130 performs the real-time control whereas typically also a SCADA system is implemented for control at the supervisory level. In embodiments, the controller and/or the SCADA system are adapted to adjust their respective internal clocks (an exemplary internal clock 135 is schematically shown in FIG. 3) and/or memories with the time information determined from GPS signal 50. Thus, the internal system times are synchronized between different controllers and/or SCADA systems within a single wind turbine and/or between different wind turbines of a wind farm. Accordingly, the problem of system clock drift is overcome. Furthermore, the system log provided by controller 130 and/or SCADA system 130 is very precise so that faulty events can be studied in detail by a remote control center and/or service staff.

Figure 4:
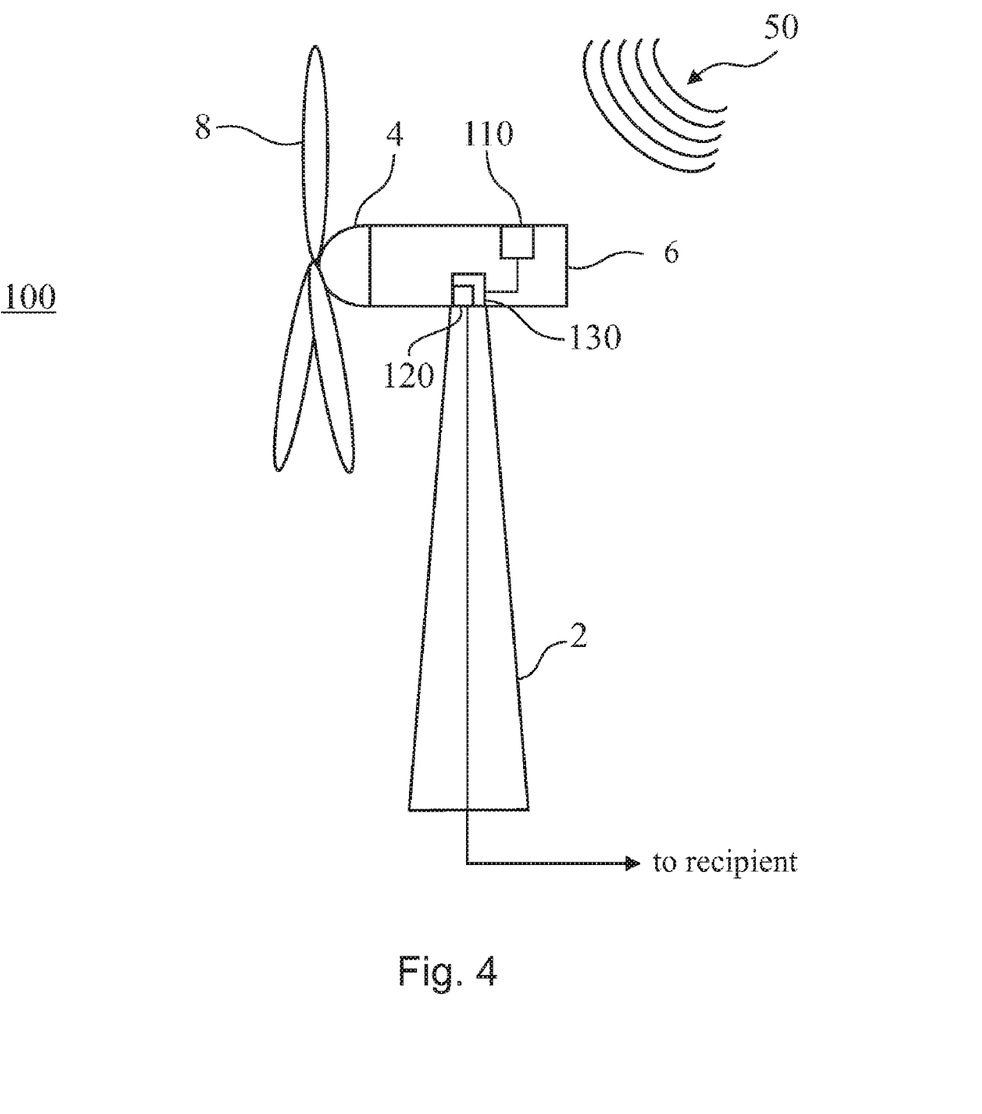
FIG. 4 shows a side view of a wind turbine according to still another embodiment.

FIG. 4 shows a side view of a wind turbine 100 according to still another embodiment. Therein, communication device 120 is integrated into controller/SCADA system 130. For example, controller/SCADA system 130 may include an interface allowing internet access, e.g. a modem or router. In another example, controller/SCADA system 130 may include a WLAN interface.

Figure 5:
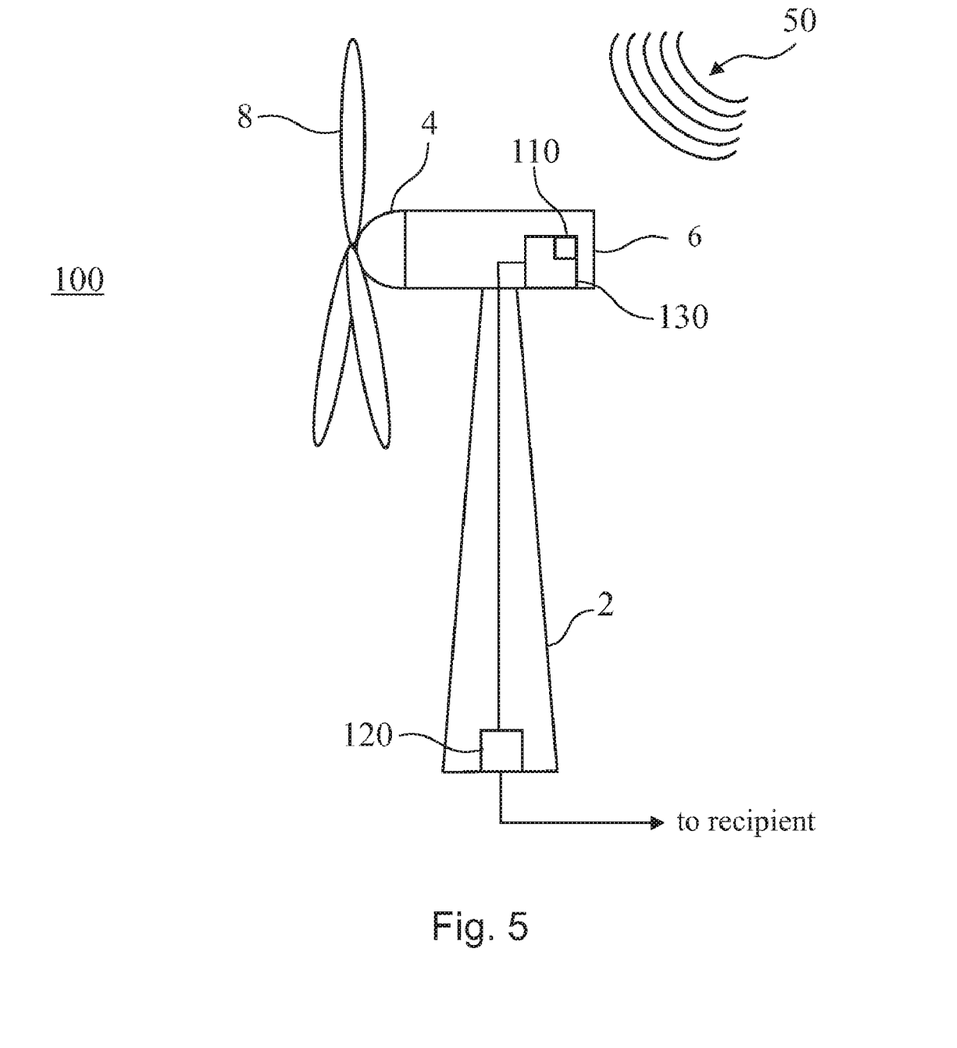
FIG. 5 shows a side view of a wind turbine according to just another embodiment.

FIG. 5 shows a side view of a wind turbine 100 according to just another embodiment. Therein, GPS receiver 110 is integrated into wind turbine controller 130. Thus, a compact configuration of GPS receiver 110 and controller 130 can be achieved. Furthermore, time delay due to the runtime of signals can reduced.

Figure 6:
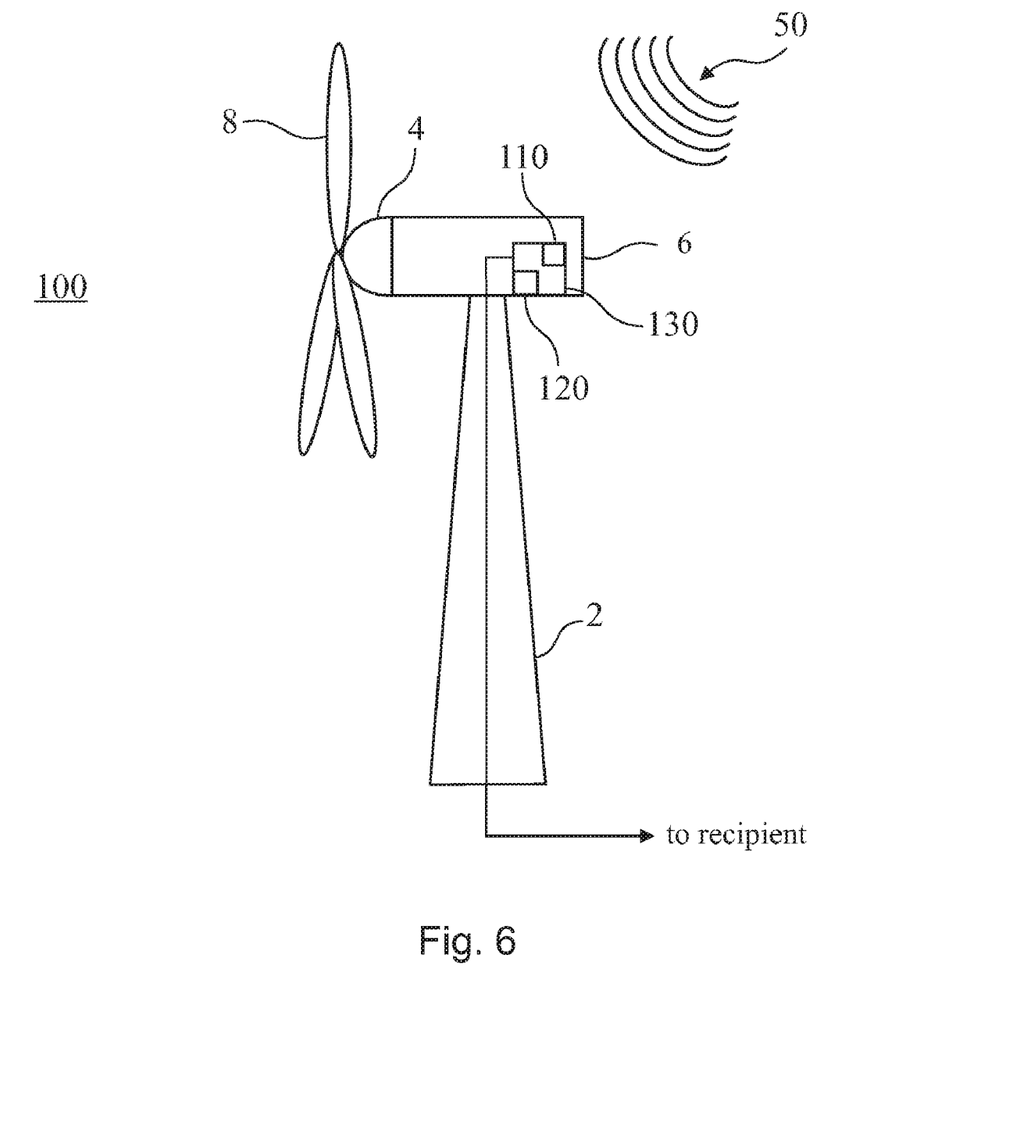
FIG. 6 shows a side view of a wind turbine according to a further embodiment.

FIG. 6 shows a side view of a wind turbine 100 according to a further embodiment. Therein, GPS receiver 110 is integrated into controller/SCADA system 130 together with communication device 120. For example, controller/SCADA system 130 may include an interface allowing internet access, e.g. a modem or router. In another example, controller/SCADA system 130 may include a WLAN interface. Thus, a compact configuration of GPS receiver 110 and controller 130 can be achieved. Furthermore, time delay due to the runtime of signals can reduced.

Figure 7:
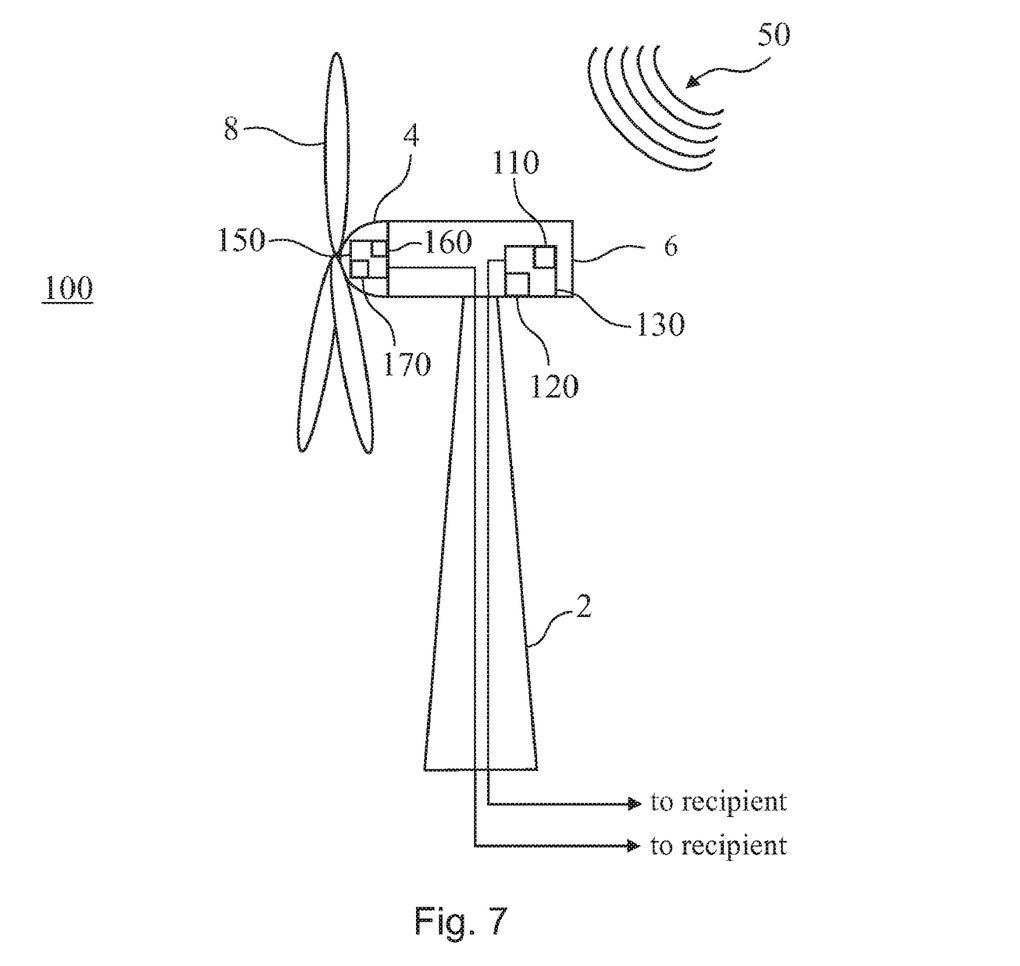
FIG. 7 shows a side view of a wind turbine according to still a further embodiment.

FIG. 7 shows a side view of a wind turbine 100 according to still a further embodiment. Therein, wind turbine 100 comprises a first GPS receiver 110 and a second GPS receiver 160. The first GPS receiver 110 is integrated or connected to a first wind turbine controller 130 located within nacelle 6 of wind turbine 100. Second GPS receiver 160 is integrated or connected to a second wind turbine controller 150 positioned within hub 4. Alternatively, second GPS receiver 160 may be connected to the SCADA system whereas first GPS receiver 110 is connected to wind turbine controller 130. Furthermore, second controller 150 has also a second communication device 170 which allows communicating any information extracted from GPS signal 50 by GPS receiver 160 to a remote recipient. In particular, the time and position calculated from GPS signal 50 may be assigned to any event logged by second controller 150. Thus, the overall redundancy of the wind turbine control system is enhanced since the exact time and position can still be transmitted by second controller 150 if the GPS receiver of first controller 130 is not operating correctly or vice versa.

In an alternative embodiment (not shown), two or more wind turbine controllers and/or the SCADA system share one GPS receiver. This results in a cost reduction compared to the system shown in FIG. 7. However, redundancy of the system is also reduced so that the number of GPS receivers shared by the wind turbine controllers and/or the SCADA system must be balanced with the required redundancy of the system in view of costs and safety.

Figure 8:
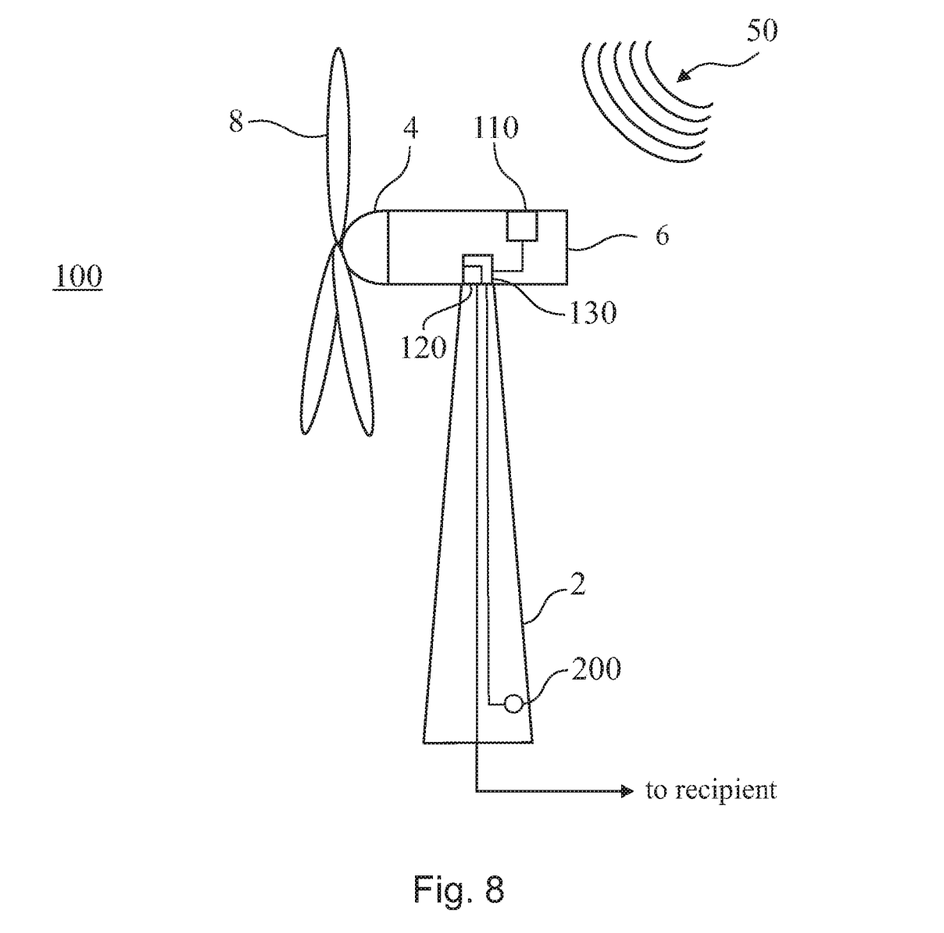
FIG. 8 shows a side view of a wind turbine according to just a further embodiment.

FIG. 8 shows a side view of a wind turbine 100 according to just a further embodiment. Therein, wind turbine 100 includes at least one emergency button 200. As shown in FIG. 8, emergency button 200 may be located at the foot of tower 2. However, emergency button 200 may also be located at other positions within wind turbine 100, e.g. within nacelle 6 and/or hub 4. Of course, several emergency buttons 200 may be provided within the same wind turbine at different locations. When emergency button 200 is pressed, it causes wind turbine 100 to release an alarm message to an external recipient. For example, emergency button 200 may be connected to wind turbine controller 130. When emergency button 200 is pressed, controller 130 is caused to transmit an alarm message via communication device 120 to an external recipient, e.g. a fire department or an ambulance. The exact time and position of the wind turbine determined from GPS signal 50 will be automatically included into the alarm message so that an emergency doctor and/or fire fighters are immediately informed about the location where an accident happened. According to another embodiment, emergency button 200 will have a separate communication device (not shown) to transmit the alarm message. Furthermore, voice communication to the ambulance and/or fire department may be provided when pressing emergency button 200.

Figure 9:
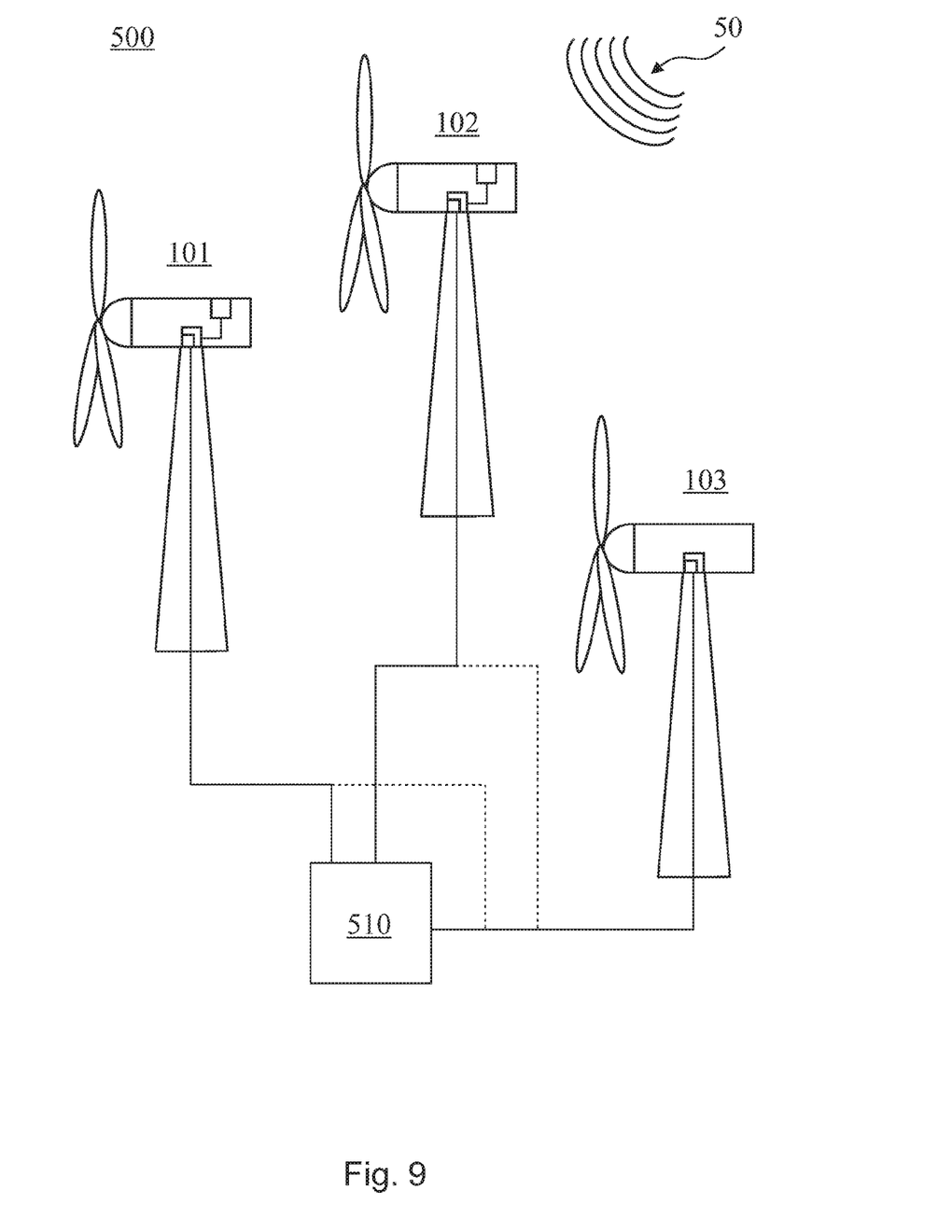
FIG. 9 shows a side view of a wind farm according to an embodiment.

FIG. 9 shows a side view of a wind farm 500 according to an embodiment. Wind farm 500 includes three wind turbines 101, 102, 103 which are connected to a centralized wind farm controller 510. However, it will be understood by those skilled in the art that the number of three wind turbines is just exemplary and by no means intended as limiting. In particular, wind farm 500 may include any number of two or more wind turbines. As shown in FIG. 9, wind turbines 101 and 102 each include a GPS receiver adapted for receiving GPS signal 50 and to determine position information, time information and date information therefrom. Each of wind turbines 101, 102 has a communication device for transmitting the time and position determined by its respective GPS receiver to centralized wind farm controller 510. Typically, the SCADA system of wind farm 500 is running on centralized controller 500 so that the SCADA system is provided with exact time and position data. Furthermore, centralized controller 510 is adapted to communicate with the controllers of the wind turbines within wind farm 500, and in particular to transmit time and position to these controllers. Thus, the time and position information can be synchronized between the controllers of wind turbines 101 and 102 as well as the SCADA system.

However, wind farm 500 includes a further wind turbine 103 which does not have a GPS receiver. For example, wind turbine 103 may be an older model installed before wind turbines 101 and 102 and not yet being retrofitted with a GPS receiver. However, wind turbine 103 is adapted to receive the position, time and/or date from either centralized controller 510 directly from one or both of wind turbines 101, 102 comprising a GPS receiver. In the latter case, direct communication is enabled between wind turbines 101, 102 and further wind turbine 103, e.g. by direct communication channels (dashed lines in FIG. 9). In one example, the wind turbines 101, 102, 103 within wind farm 500 may directly communicate with one another via a wind farm WLAN. Due to the communication with centralized controller 510 and/or wind turbines 101, 102, even wind turbine 103 lacking its own GPS receiver is provided with exact time information. The exact position of wind turbine 103 can be calculated from the position data for wind turbines 101, 102 and the respective distances of wind turbine 103 to these other wind turbines.

Figure 10:
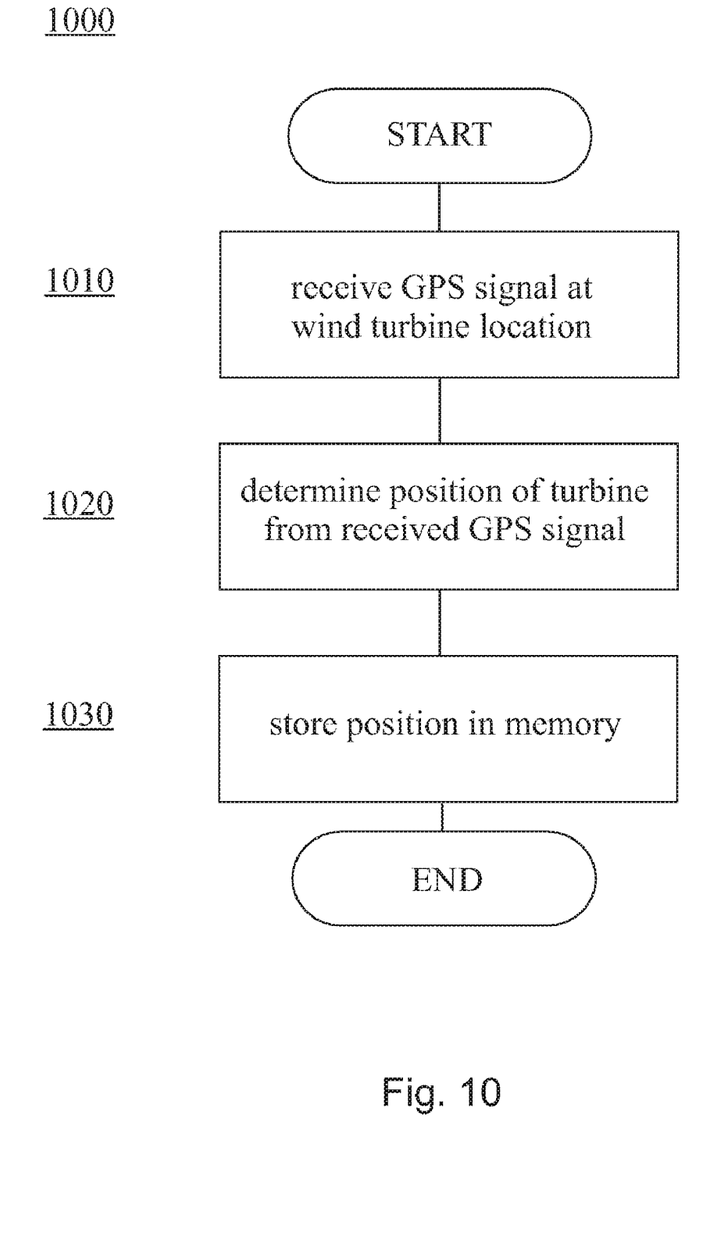
FIG. 10 shows a flowchart of a method according to an embodiment.

FIG. 10 shows a flowchart of a method 1000 according to an embodiment. In particular, a method 1000 of installing a wind turbine includes receiving a GPS signal with a GPS receiver at the location of the wind turbine. For example, this can be done with a hand-held GPS receiver available from Garmin Ltd., George Town, Cayman Islands, used by construction engineers at the construction site. With such a GPS receiver, the exact position of the wind turbine is determined from the GPS signal received at the location of the wind turbine. Finally, the exact position of the wind turbine is stored in a memory. For example, the position can be stored in a memory of a wind turbine controller and/or in a memory of a SCADA system of said wind turbine and/or in a memory at a remote control center. Thus, the exact position of the wind turbine is readily available for service and/or maintenance staff as well as in cases of emergency. However, this method allows to exactly locate the wind turbine during operation without having the need of constantly providing a GPS receiver at the wind turbine.

This written description uses examples to disclose embodiments, including the best mode, and also to enable any person skilled in the art to make and use such embodiments. While various specific embodiments have been described, those skilled in the art will recognize other embodiments can be practiced with modification within the spirit and scope of the claims. Especially, mutually non-exclusive features of the embodiments described above may be combined with each other. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wind turbine comprising:
    a receiver adapted to receive a signal from a satellite-based navigation system and to determine time information from the signal;
    a communication device operatively connected to the receiver and adapted to transmit the time information to a recipient located remotely from said wind turbine; and a controller comprising a first internal clock, the controller being operatively connected to the receiver and adapted to adjust the first internal clock with the time information.

2. The wind turbine according to claim 1, wherein the receiver is a GPS receiver adapted to receive a GPS signal.

3. The wind turbine of claim 1, wherein the receiver is integrated into the controller.

4. The wind turbine according to claim 1, wherein the controller further comprises a memory, the receiver being further adapted to determine at least one of position information and date information from the signal, the controller being adapted to adjust the memory with the at least one of position information and date information.

5. The wind turbine of claim 1, further comprising a Supervisory Control and Data Acquisition (SCADA) system.

6. The wind turbine according to claim 5, wherein the SCADA system comprises a second internal clock, and wherein the SCADA system is operatively connected to the receiver and adapted to adjust the second internal clock with the time information.

7. The wind turbine according to claim 5, further comprising a second receiver adapted to receive the signal from the satellite-based navigation system and to determine at least one of position information, time information and date information from the signal, the SCADA system being operatively connected to the second receiver.

8. The wind turbine according to claim 1, wherein the receiver is installed at a nacelle of the wind turbine.

9. The wind turbine according to claim 1, wherein the recipient is a remote control center.

10. The wind turbine according to claim 1, wherein the recipient is a service or maintenance center.

11. The wind turbine according to claim 1, wherein the recipient is a mobile receiver for service or maintenance personnel.

12. The wind turbine according to claim 1, wherein the receiver is adapted to determine information regarding the time information and one of position information and date information from the signal, and the wind turbine is adapted to include in the information an alarm message.

13. The wind turbine according to claim 12, further comprising an emergency button, wherein when pressed, said emergency button is adapted to cause the alarm message to be sent to the recipient.

14. The wind turbine according to claim 1, further comprising a second controller, a second receiver adapted to receive the signal from the satellite-based navigation system and to determine at least one of position information, time information and date information from the signal, the second controller being operatively connected to the second receiver, and a second communication device operatively connected to the second receiver and adapted to transmit the at least one of position information, time information and date information to the recipient.

15. A wind farm comprising
at least two wind turbines of claim 1.

16. The wind farm according to claim 15, further comprising a centralized wind farm controller, wherein the receiver of each of the at least two wind turbines is adapted to determine information regarding the time information and one of position information and date information from the signal, the communication device of each of the at least two wind turbines is adapted to transmit the information determined by its respective receiver to the centralized wind farm controller.

17. The wind farm according to claim 16, further comprising at least one further wind turbine adapted to receive the information from at least one of the at least two wind turbines.

* * * * *